ELECTRONIC TRIGGER CIRCUIT
Filed Dec. 7, 1954
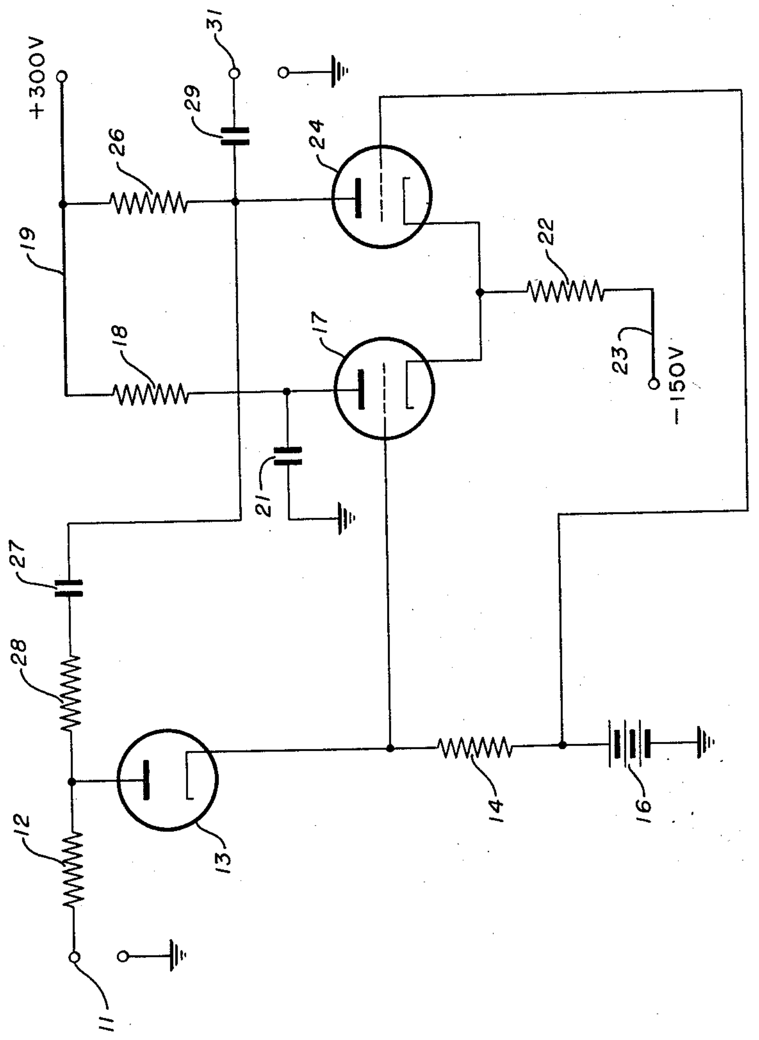
INVENTOR.
JEROME A. G. RUSSELL
BY
Roland A. Anderson
ATTORNEY.

United States Patent Office 2,819,396

Patented Jan. 7, 1958

2,819,396

ELECTRONIC TRIGGER CIRCUIT

Jerome A. G. Russell, El Cerrito, Calif., assignor to the United States of America as represented by the United States Atomic Energy Commission Application December 7, 1954, Serial No. 473,764

8 Claims. (Cl. 250—27)

The present invention relates generally to an electronic trigger circuit and, more particularly, to an improved type of trigger circuit whereby an output pulse is obtained only after an input voltage has equaled or exceeded a selected reference voltage.

The accuracy with which a trigger circuit coordinates the production of an output trigger signal with a desired value of input voltage is dependent primarily upon the accuracy with which an input tube maintains constant parameters. Unfortunately, the deleterious effects of aging, temperature variation, etc., cause changes in vacuum tube characteristics, particularly in the multi-element tubes. The present invention minimizes this effect through the use of a diode input tube, the diode having a more constant current flow break point than the tubes having more electrodes. Most prior trigger circuits are fixed in the value of input voltage which will produce a trigger pulse. The present invention may easily be made variable as to this characteristic, thus presenting a scope of possible applications to which many previous trigger circuits are not adaptable.

In general, the invention comprises a source of direct current reference voltage in series with an impedance and a diode rectifying element. The diode is connected to oppose current flow from the source of reference voltage, therefore, when an input signal is applied to the aforementioned series elements, it must equal or exceed the reference voltage before diode current will flow. A current flow through the diode means a voltage differential will be developed across the impedance. An amplifier is coupled to the impedance so that the voltage change across the impedance is amplified. A positive feedback system applies a portion of the amplifier output voltage to the diode so that the amplifier produces a steep wave front trigger pulse at the output.

It is an object of the present invention to provide an improved means for generating a trigger pulse.

It is another object of the present invention to provide means for accurately producing a trigger pulse when an input voltage attains a preselected value.

It is still another object to provide an improved means for comparing a variable voltage with a standard potential.

The invention, both as to its organization and method of operation, together with further objects and advantages thereof, will be better understood by reference to the following specification taken in conjunction with the accompanying drawing in which there is shown one preferred embodiment of the present invention in schematic form.

Referring now to the drawing, there is provided an input terminal 11 for ready connection to a source of alternating voltage or direct current signals (not shown). A resistance 12 is connected between input terminal 11 and a non-linear or unidirectional circuit element, in this instance the anode of a diode vacuum tube 13. A diode resistor 14 is connected between the cathode of the diode tube 13 and a positive reference voltage source 16, which may be either a direct current source varying in a programmed manner or a constant value of voltage, as indicated here by a battery. The potential of source 16 to circuit ground is established at the desired value of voltage which an input signal must attain to instigate an output triggering signal.

When a positive input signal voltage exceeds the voltage of the source 16 a current will flow through the diode resistor 14, consequently raising the cathode potential of the diode 13. To provide amplification and feedback of the voltage developed across the diode resistor 14, the control electrode of an isolating vacuum tube, in this instance a triode tube 17, is coupled to the cathode of the diode 13. A first anode resistor 18 couples the anode electrode of the first triode 17 to a positive voltage bus 19 while a decoupling capacitor 21 is connected between the anode of the first triode 17 and circuit ground. The decoupling capacitor 21 and the first anode resistor 18 together are selected to have a long time constant with reference to variations of voltage anticipated at input terminal 11 and thus to hold the anode of the first triode 17 at a constant potential so that such first triode 17 acts as a cathode follower.

A cathode resistor 22 couples the cathode of the first triode 17 to a negative voltage bus 23. The cathode of an amplifying vacuum tube, here a second triode 24, is connected to the cathode of the first triode 17, and thus the cathode resistor 22 serves both the first triode 17 and the second triode 24. The grid electrode of the second triode 24 is held at a fixed positive biasing potential, in this case by connection to the juncture of diode resistor 14 and source 16. The anode of the second triode 24 is coupled to the positive voltage bus 19 through a second anode resistor 26.

With the first triode 17 acting as a cathode follower, the voltages on the cathodes of both first triode 17 and second triode 24 will be altered as the voltage at the cathode of the diode 13 varies. The grid electrode of the second triode 24 is held at a constant potential, the variations in the cathode voltage varying the grid bias, thus producing an amplified output at the anode of the second triode 24. The resistance value of the second anode resistor 26 is several times greater than the resistance of the first anode resistor 18, thus the current passing through the first triode 17 makes up the major portion of the current passing through the cathode resistor 22. Such action minimizes a negative feedback effect at the cathode of the second triode 24 since that tube has an unappreciable effect on the voltage developed across the cathode resistor 22. A positive feedback network comprising a feedback capacitor 27 and a feedback resistor 28 couples the anode of the second triode 24 to the anode of the diode 13. The anode of second triode 24 is tied through a coupling capacitor 29 to an output terminal 31 where a triggering signal is available to actuate associated equipment (not shown).

To summarize the operation of the device, assume the presence of a rising input potential at the input terminal 11. When the input potential slightly exceeds the voltage of the source 16 or reference voltage, the anode of diode 13 will be more positive than the cathode, thus allowing a current to flow. The diode 13 current develops a voltage across the resistor 14 causing a rise in the potential of the control electrode of the first triode 17. Through the use of the common cathode resistor 22 the current flow through the second triode 24 is decreased with a resultant rise in anode potential. The rising anode potenitial at the second triode 24 is applied to the anode of the diode 13 as positive feedback, the end effect being a steep wave front pulse at the output terminal 31.

It will be seen that arrangements and combinations other than the one described are possible. For instance, the polarities of the diode 13 and source 16 might be reversed so that a negative potential would produce a trigger pulse. The relative positions of the elements in the input circuit might be varied or a different type of amplifier employed.

While the invention has been disclosed with respect to a single preferred embodiment, it will be apparent to those skilled in the art that numerous variations and modifications may be made within the spirit and scope of the invention, and thus it is not intended to limit the invention except as defined in the following claims.

What is claimed is:

1. In a circuit of the character described, the combination comprising a reference voltage source, a unidirectional circuit element connected to an input, an impedance connected between said reference voltage source and said unidirectional circuit element, an amplifier coupled to said impedance and responsive to conduction therethrough, and positive feedback from the output side of said amplifier through said unidirectional circuit element to the input of said amplifier.

2. In an electronic circuit, the combination comprising an input terminal, a direct current comparison voltage source, a non-linear circuit element connected between said input terminal and said comparison voltage source, an impedance included in the connection between said non-linear circuit element and said comparison voltage source, an amplifier coupled to said impedance, and a positive feedback system coupling the output side of said amplifier through said non-linear circuit element to said impedance.

3. In an electronic trigger circuit, the combination comprising an input terminal, a reference potential supply, a unidirectional circuit element coupled to said input terminal, an impedance connected between said reference potential supply and said unidirectional circuit element, an amplifier coupled to said impedance, and a positive feedback element coupling a portion of the output of said amplifier to the input side of said amplifier through said unidirectional circuit element.

4. In a trigger circuit, the combination comprising an input terminal, a comparison voltage source, a diode coupled to said input terminal, an impedance connected in series between said comparison voltage source and said diode, an amplifier coupled to the juncture of said impedance and said diode, and positive feedback means coupling a portion of the output of said amplifier through said diode to the input of said amplifier.

5. In an electronic trigger circuit, the combination comprising an input terminal, a diode having an anode and a cathode with the anode coupled to said input terminal, a direct current reference voltage supply, a resistance connected in series between said reference voltage supply and the cathode of said diode, an amplifier coupled to the juncture of said resistance and said diode, and a positive feedback network connected from the output of said amplifier to the input terminal side of said diode.

6. In a trigger circuit, the combination comprising an input terminal, a diode coupled to said input terminal, a direct current comparison potential supply, a resistor coupling said diode to said comparison potential supply, an isolating and amplifying stage coupled to the juncture of said resistance and said diode, and a positive feedback system coupling a portion of the output of said amplifying stage through said diode to the input of said isolating and amplifying stage.

7. In a trigger circuit, the combination comprising an input terminal, a reference potential source, a diode connected to said input terminal, a resistor connected between said diode and said reference potential source, an isolating vacuum tube having an anode held at a constant potential and a control electrode connected to the juncture of said diode and said resistor, an amplifier vacuum tube having a grid electrode held at a constant bias, a common cathode resistor coupled to the cathodes of said isolating vacuum tube and said amplifier vacuum tube, and positive feedback means coupling the anode of said amplifier vacuum tube to the input terminal side of said diode.

8. In a trigger circuit, the combination comprising an input terminal, a reference voltage source having a positive potential, a diode having an anode and a cathode with the anode coupled to said input terminal, a resistor connected in series between the cathode of said diode and a positive terminal of said reference voltage source, an amplifier coupled to the cathode of said diode, a positive feedback network having a resistor connected in series with a capacitor connected from the output of said amplifier to the anode of said diode.

References Cited in the file of this patent

UNITED STATES PATENTS

| | | |
|---|---|---|
| 2,423,931 | Etter | July 15, 1947 |
| 2,683,806 | Moody | July 13, 1954 |